United States Patent
Kucera et al.

(10) Patent No.: US 11,342,874 B2
(45) Date of Patent: May 24, 2022

(54) ADAPTIVE ACTUATOR FOR OPERATING ON A THREE OR FOUR-WIRE EXTERNAL CONTROL LINE WITH DIFFERENT MOTOR VOLTAGES AND NETWORK FREQUENCIES

(71) Applicant: Siemens Schweiz AG, Zürich (CH)

(72) Inventors: Ladislav Kucera, Thalwil (CH); Ronald Reichmuth, Einsiedeln (CH); Sacha Soltermann, Steinhausen (CH)

(73) Assignee: SIEMENS SCHWEIZ AG, Zurich (CH)

( * ) Notice: Subject to any disclaimer, the term of this patent is extended or adjusted under 35 U.S.C. 154(b) by 173 days.

(21) Appl. No.: 16/801,633

(22) PCT Filed: Aug. 31, 2017

(86) PCT No.: PCT/EP2017/071929
§ 371 (c)(1),
(2) Date: Feb. 26, 2020

(87) PCT Pub. No.: WO2019/042562
PCT Pub. Date: Mar. 7, 2019

(65) Prior Publication Data
US 2021/0367543 A1    Nov. 25, 2021

(51) Int. Cl.
*H02P 27/04* (2016.01)
*H02P 25/03* (2016.01)
*H02P 23/00* (2016.01)

(52) U.S. Cl.
CPC ......... *H02P 27/04* (2013.01); *H02P 23/0004* (2013.01); *H02P 25/03* (2016.02)

(58) Field of Classification Search
CPC ....... H02P 27/04; H02P 23/0004; H02P 25/03
(Continued)

(56) References Cited

U.S. PATENT DOCUMENTS

| 5,874,821 | A  | * | 2/1999 | Monleone | H02P 6/16 318/600 |
| 8,219,290 | B2 | * | 7/2012 | Ogawa | F16H 61/16 701/51 |
| 10,673,361 | B2 | * | 6/2020 | Liniger | H02P 8/08 |

FOREIGN PATENT DOCUMENTS

| DE | 10 2011 119 067 A1 | 5/2013 | ............. F16K 31/00 |
| WO | 02/095926 A1 | 11/2002 | ................ H02P 3/18 |
| WO | 2019/042562 A1 | 3/2019 | ............. G05B 19/00 |

OTHER PUBLICATIONS

Siemens, "Stellantriebe für Luftklappen," GLB..1E, Document-ID A6V10636202_de-_b, Dec. 14, 2016, Issue—Dec. 14, 2016, Siemens, Building Technologies, https://www.downloads.siemens.com/download-center/Download.aspx?pos=download&fct=getasset&idl=A6V10636202 10 pages, pp. 1, 3, 5, 7 (German language w/English translation), 2016.

(Continued)

*Primary Examiner* — David Luo
(74) *Attorney, Agent, or Firm* — Slayden Grubert Beard PLLC

(57) ABSTRACT

Various embodiments include an actuator comprising: a motor; a transmission; an actuating connection; a first motor line and second motor line and a ground line. The motor is driven in a first or second direction by a motor voltage applied to the first or second motor line. There is also a motor control unit comprising a signal evaluation unit and a downstream actuating device for the motor, and a voltage supply unit to provide, from the first and/or second motor voltage, a supply DC voltage for a power supply of the motor control unit. The signal evaluation unit produces, for the duration of the application of the first and/or second motor voltage to the first and second motor line, associated actuating signals. The motor control unit electrically con- (Continued)

trols the motor in the associated first or second direction of rotation on the basis of actuating signals.

13 Claims, 4 Drawing Sheets

(58) Field of Classification Search
USPC .............................. 318/400.3, 400.01, 700
See application file for complete search history.

(56) References Cited

OTHER PUBLICATIONS

International Search Report and Written Opinion, Application No. PCT/EP2017/071929, 19 pages, dated May 25, 2018.

* cited by examiner

US 11,342,874 B2

ADAPTIVE ACTUATOR FOR OPERATING ON A THREE OR FOUR-WIRE EXTERNAL CONTROL LINE WITH DIFFERENT MOTOR VOLTAGES AND NETWORK FREQUENCIES

CROSS-REFERENCE TO RELATED APPLICATIONS

This application is a U.S. National Stage Application of International Application No. PCT/EP2017/071929 filed Aug. 31, 2017, the contents of which are hereby incorporated by reference in their entirety.

TECHNICAL FIELD

The present disclosure relates to actuators. Various embodiments may include actuators for a flap or a valve, in particular for adjusting a volume flow for the heating, ventilation or air conditioning of a building.

BACKGROUND

Some actuators comprise a motor, a transmission arranged downstream therefrom, typically a reduction gear, an actuating connection for connecting the flap or the valve, and an electrical connection for connecting the actuator to an external control line. The external control line is used to supply energy to the actuator and to determine the direction of rotation of the motor. It comprises a first and second motor line and a ground line as a reference potential. The motor can be driven in the first or second direction of rotation on the basis of a respective first or second motor voltage applied to the first or second motor line. Such an actuator is connected to both motor lines, also designated as Y1 line and Y2 line, for the power supply. The first and second motor voltage can also be designated as first and second motor control voltage or first and second control voltage.

SUMMARY

Some embodiments of the teachings herein include an actuator for a flap (6) or a valve (7), comprising a motor (3'), a transmission (4) connected downstream therefrom, an actuating connection (5) for connecting the flap (6) or the valve (7), and an electrical connection (AN) for connecting the actuator to an external control line (SL), which is used to supply energy to the actuator and to determine the direction of rotation of the motor (3') and has a first and second motor line (LY1, LY2) and a ground line (GND), wherein the motor (3') can be driven in the first or second direction of rotation on the basis of a respective first or second motor voltage (UY1, UY2) applied to the first or second motor line (LY1, LY2), characterized in that the motor (3) is a brushless DC motor, the actuator has a motor control unit (1) which comprises a signal evaluation unit (SA) and a downstream actuating device (SE) for the motor (3), the actuator has a voltage supply unit (2) which is designed to provide, from the first and/or second motor voltage (UY1, UY2), a supply DC voltage (UP) for the power supply of the motor control unit (1), the signal evaluation unit (SA) is designed to produce, for the duration of the application of the first and/or second motor voltage (UY1, UY2) to the first and second motor line (LY1, LY2), associated actuating signals ($S_{OPEN}$, $S_{Y1}$, $S_{Y2}$, $S_{Y1+Y2}$) for the actuating device (SE), and the actuating device (SE) is designed to electrically control the motor (3) in the associated first or second direction of rotation on the basis of this.

In some embodiments, the signal evaluation unit (SA) of the motor control unit (1) comprises: a digitization stage (DIG) with a plurality of A/D converters (ADC) for converting the two motor voltages (UY1, UY2) into corresponding digital motor voltage signals (Y1, Y2), a digital mixer stage (SF) for producing in each case a beat signal ($Y1_{AC.R}$, $Y2_{AC.R}$) from the digitized motor voltage signals (Y1, Y2) supplied on the input side and from a demodulation frequency ($f_0$), wherein the respective beat signal ($Y1_{AC.R}$, $Y2_{AC.R}$) represents the effective value of the demodulated motor voltage signals, and a classification stage (BW), which is designed to produce, from the two beat signals ($Y1_{AC.R}$, $Y2_{AC.R}$), the actuating signals ($S_{OPEN}$, $S_{Y1}$, $S_{Y2}$, $S_{Y1+Y2}$) for the downstream actuating device (SE) of the actuator.

In some embodiments, the digitization stage (DIG) also has an A/D converter (ADC) for converting the supply DC voltage (UP) into a corresponding digital supply DC voltage signal (PS), wherein the signal evaluation unit (SA) has a series of digital filters with moving average for filtering the supply DC voltage signal (UP) into a filtered supply DC voltage signal ($PS_{DC}$) and for filtering the digitized motor voltage signals (Y1, Y2) into filtered motor voltage signals ($Y1_{DC}$, $Y2_{DC}$), wherein the digital mixer stage (SF) is also designed to produce a digital signal ($\varphi_{AC}$) for a phase angle between the digitized motor voltage signals (Y1, Y2), and wherein the classification stage (BW) is designed to produce the actuating signals ($S_{OPEN}$, $S_{Y1}$, $S_{Y2}$, $S_{Y1+Y2}$) and output them to the downstream actuating device (SE), as a function of whether a current value of the filtered motor voltage signals ($Y1_{DC}$, $Y2_{DC}$) is less than a first DC voltage comparison value $DC_{LOW}$, exceeds a second DC voltage comparison value $DC_{UPP}$, or lies between both DC voltage comparison values $DC_{LOW}$, $DC_{UPP}$, whether a current value of the respective effective value signal ($Y1_{AC.R}$, $Y2_{AC.R}$) exceeds a comparison value $AC_{UPP}$, and whether a current value of the phase angle signal ($\varphi_{AC}$) is less than a first angle value $Phi_{LOW}$, exceeds a second angle value $Phi_{UPP}$, or lies between both angle values $Phi_{LOW}$, $Phi_{UPP}$, wherein the first and second DC voltage comparison value $DC_{LOW}$, $DC_{UPP}$, the comparison value $AC_{UPP}$ and the first and second angle value $Phi_{LOW}$, $Phi_{UPP}$ are normalized to a current value of the filtered DC voltage supply signal ($PS_{DC}$).

In some embodiments, the digital mixer stage (SF) comprises a quadrature demodulator (DEMOD) and a transformation stage (TRANS) arranged downstream therefrom, wherein the quadrature demodulator (DEMOD) has a sine and cosine frequency generator (FG) for producing the demodulation frequency ($f_0$) and is designed to demodulate the two motor voltage signals (Y1, Y2), these being supplied on the input side, using the demodulation frequency ($f_0$) in each case, and to output these as digital signals with an associated real part ($Y1_{AC.RE}$, $Y2_{AC.RE}$) and an associated imaginary part ($Y1_{AC.IM}$, $Y2_{AC.IM}$) in each case, and wherein the transformation stage (TRANS) is designed to form the two effective value signals ($Y1_{AC.R}$, $Y2_{AC.R}$) and the phase angle signal ($\varphi_{AC}$) from the digital signals with the real and imaginary parts ($Y1_{AC.RE}$, $Y2_{AC.RE}$, $Y1_{AC.IM}$, $Y2_{AC.IM}$) by means of polar coordinate transformation, and to output said effective value signals ($Y1_{AC.R}$, $Y2_{AC.R}$) to the classification unit (BW).

In some embodiments, the classification stage (BW) comprises a normalization and comparator stage (KOMP) followed by a decision stage (EB), wherein the normalization and comparator stage (KOMP) is designed to produce, from a current value of the filtered supply DC voltage signal ($PS_{DC}$), normalized decision thresholds (SW) for the filtered motor voltage signals ($Y1_{DC}$, $Y2_{DC}$) and for the effective value signals ($Y1_{AC.R}$, $Y2_{AC.R}$), to output these to a series of comparators (K) and to output the binary comparison results $Y1_{DC.S}$, $Y1_{DC.G}$, $Y2_{DC.S}$, $Y2_{DC.G}$, $Y1_{AC.G}$, $Y2_{AC.G}$, $Phi_S$, $Phi_G$ with the filtered motor voltage signals ($Y1_{DC}$, $Y2_{DC}$) and the effective value signals ($Y1_{AC.R}$, $Y2_{AC.R}$) to the decision stage (EB), wherein the decision stage (EB) is designed to produce and output the actuating signals ($S_{OPEN}$, $S_{Y1}$, $S_{Y2}$, $S_{Y1+Y2}$) for the downstream actuating device (SE) of the actuator according to a binary decision tree.

In some embodiments, the signal evaluation unit (SA) is designed to filter the digital signals with associated real part ($Y1_{AC.RE}$, $Y2_{AC.RE}$) and associated imaginary part ($Y1_{AC.IM}$, $Y2_{AC.IM}$) output by the quadrature demodulator (DEMOD) in each case, by means of a filter with moving average, and then to output said digital signals to the transformation stage (TRANS).

In some embodiments, the actuator can also be connected to an external control line (SL) with an additional supply voltage line (G) for a further energy supply to the actuator, wherein the voltage supply unit (2) is then also designed to provide, from a supply voltage (UPS) that is applied to the supply voltage line (G), the supply DC voltage (UP) for the power supply of the motor control unit (1), wherein the signal evaluation unit (SA) comprises a digitization stage (DIG) with a plurality of A/D converters (ADC) for converting the two motor voltages (UY1, UY2) into corresponding digital motor voltage signals (Y1, Y2), wherein the signal evaluation unit (SA) comprises a digital mixer stage (SF) for producing in each case a beat signal ($Y1_{AC.R}$, $Y2_{AC.R}$) from the two digitized motor voltage signals (Y1, Y2) supplied on the input side and from a demodulation frequency ($f_0$), wherein the respective beat signal ($Y1_{AC.R}$, $Y2_{AC.R}$) represents the effective value of the demodulated motor voltage signals, and wherein the signal evaluation unit (SA) comprises a classification stage (BW) which is designed to produce, from the two beat signals ($Y1_{AC.R}$, $Y2_{AC.R}$), the actuating signals ($S_{OPEN}$, $S_{Y1}$, $S_{Y2}$, $S_{Y1+Y2}$) for the downstream actuating device (SE) of the actuator.

In some embodiments, the digitization stage (DIG) also has an A/D converter (ADC) for converting the supply DC voltage (UP) into a corresponding digital supply DC voltage signal (PS), wherein the signal evaluation unit (SA) has a series of digital filters with moving average for filtering the supply DC voltage signal (UP) into a filtered supply DC voltage signal ($PS_{DC}$) and for filtering the digitized motor voltage signals (Y1, Y2) into filtered motor voltage signals ($Y1_{DC}$, $Y2_{DC}$), and wherein the signal evaluation unit (SA) has a classification stage (BW) which is designed to produce and output the actuating signals ($S_{OPEN}$, $S_{Y1}$, $S_{Y2}$, $S_{Y1+Y2}$) for the downstream actuating device (SE) of the actuator, as a function of whether a current value of the filtered motor voltage signals ($Y1_{DC}$, $Y2_{DC}$) is less than a first DC voltage comparison value $DC_{LOW}$, exceeds a second DC voltage comparison value $DC_{UPP}$, or remains between both DC voltage comparison values $DC_{LOW}$, $DC_{UPP}$, and whether a current value of the respective effective value signal ($Y1_{AC.R}$, $Y2_{AC.R}$) is less than a first comparison value $AC_{LOW}$, exceeds a second comparison value $AC_{UPP}$, or remains between both comparison values $AC_{LOW}$, $AC_{UPP}$, and wherein the first and second DC voltage comparison value $DC_{LOW}$, $DC_{UPP}$ and the first and second comparison value $AC_{LOW}$, $AC_{UPP}$ are normalized to a current value of the filtered DC voltage supply signal ($PS_S$).

In some embodiments, the digital mixer stage (SF) comprises a quadrature demodulator (DEMOD) and a transformation stage (TRANS) arranged downstream therefrom, wherein the quadrature demodulator (DEMOD) has a sine and cosine frequency generator (FG) for producing the demodulation frequency ($f_0$) and is designed to demodulate the two motor voltage signals (Y1, Y2), these being supplied on the input side, using the demodulation frequency ($f_0$) in each case, and to output these as digital signals with an associated real part ($Y1_{AC.RE}$, $Y2_{AC.RE}$) and imaginary part ($Y1_{AC.IM}$, $Y2_{AC.IM}$) in each case, wherein the transformation stage (TRANS) is designed to form the two effective value signals ($Y1_{AC.R}$, $Y2_{AC.R}$) from the digital signals with the real and imaginary parts ($Y1_{AC.RE}$, $Y2_{AC.RE}$, $Y1_{AC.IM}$, $Y2_{AC.IM}$) by means of polar coordinate transformation and to output these effective value signals ($Y1_{AC.R}$, $Y2_{AC.R}$) to the classification unit (BW).

In some embodiments, the classification stage (BW) comprises a normalization and comparator stage (KOMP) followed by a decision stage (EB), wherein the normalization and comparator stage (KOMP) is designed to produce, from a current value of the filtered supply DC voltage signal ($PS_{DC}$), normalized decision thresholds (SW) for the filtered motor voltage signals ($Y1_{DC}$, $Y2_{DC}$) and for the effective value signals ($Y1_{AC.R}$, $Y2_{AC.R}$), to output these to a series of comparators (K) and logic gates (L) and to output the respective binary comparison results $Y1_{DC.M}$, $Y1_{DC.G}$, $Y2_{DC.M}$, $Y2_{DC.G}$, $Y1_{AC.M}$, $Y1_{AC.G}$, $Y2_{AC.M}$, $Y2_{AC.G}$ with the filtered motor voltage signals ($Y1_{DC}$, $Y2_{DC}$) and the effective value signals ($Y1_{AC.R}$, $Y2_{AC.R}$) to the decision stage (EB), and wherein the decision stage (EB) is designed to produce and output the actuating signals ($S_{OPEN}$, $S_{Y1}$, $S_{Y2}$, $S_{Y1+Y2}$) for the downstream actuating device (SE) of the actuator according to a binary decision tree.

In some embodiments, the signal evaluation unit (SA) is designed to filter the digital signals with associated real part ($Y1_{AC.RE}$, $Y2_{AC.RE}$) and associated imaginary part ($Y1_{AC.IM}$, $Y2_{AC.IM}$) output by the quadrature demodulator (DEMOD) in each case, by means of a filter with moving average, and then to output said digital signals to the transformation stage (TRANS).

In some embodiments, the demodulation frequency ($f_0$) is set to a frequency value of 55 Hz±3 Hz.

In some embodiments, the classification stage (BW) that is designed to produce the actuating signals ($S_{OPEN}$, $S_{Y1}$, $S_{Y2}$, $S_{Y1+Y2}$) is followed by a debounce filter stage ($FIL_{DB}$), which is designed to filter out short-term signal changes in the actuating signals ($S_{OPEN}$, $S_{Y1}$, $S_{Y2}$, $S_{Y1+Y2}$) and then output the filtered actuating signals to the actuating device (SE).

In some embodiments, the respective digital filter with moving average is a CIC filter.

BRIEF DESCRIPTION OF THE DRAWINGS

The properties, features and advantages of various embodiments of the teachings herein, and the manner in which these are achieved, may be clearer and easier to understand in the context of the following description of the exemplary embodiments, which are explained in greater detail with reference to the drawings. Using schematic illustrations.

DETAILED DESCRIPTION

Figure 1:
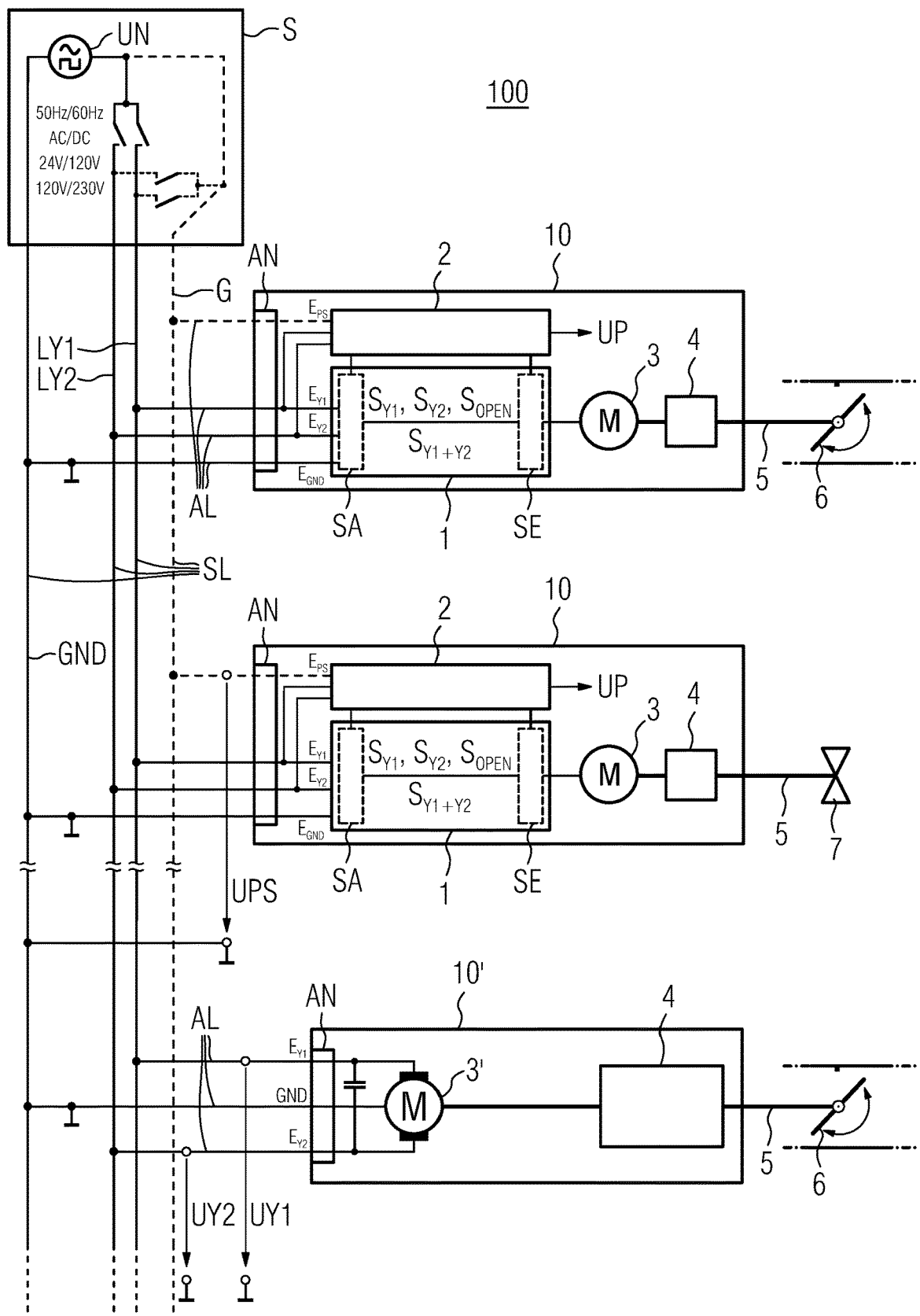
FIG. 1 shows an example of two actuators incorporating teachings of the present disclosure, each comprising a motor control unit with a voltage supply unit, a signal evaluation unit and an actuating device, in combination with a further actuator which has a passive synchronous motor.

Some actuators of older structural format comprise so-called passive synchronous motors, which can be operated directly and without further electronic circuit components on the two motor lines and on the ground line as a reference potential. The duration of a motor voltage being applied to the two motor lines determines the travel distance and/or the angle of rotation in this case. This type of induction motor comprises a starting capacitor so that the motor can be started in the desired direction of rotation (see FIG. 1, actuator 10' with synchronous motor 3'). Since such a synchronous motor accelerates very quickly when the supply is switched on, it is heavily overdimensioned in order to be able to withstand the rapid accelerations. The direct supply of such a synchronous motor is also limited to supply with an AC voltage.

In the simplest case, in order to determine the direction of rotation and to specify the travel distance for a corresponding time duration, a supply voltage (AC voltage) is switched directly onto the respective motor line, e.g. by means of a relay or a triac. The AC supply voltage typically comes from a public power supply network, e.g. an AC voltage of 230V/50 Hz (e.g. Europe) or an AC voltage of 120V/60 Hz (North America). Alternatively, an AC voltage of e.g. 24V/50 Hz or 24V/60 Hz that is derived (e.g. transformed) from an AC supply voltage can be connected directly to one of the two motor lines.

Some actuators generally comprise a brushless DC motor, i.e. a so-called BLDC, and a motor control unit with a processor-assisted microcontroller. By means of suitably programmed program steps (software), positioning can be effected rapidly and in a highly flexible manner by such an actuator. When using such an actuator, the motor control unit receives only one signal, e.g. an AC or DC signal, via the "motor lines" in order to determine the direction of rotation, or corresponding control instructions via a bus line. The voltage supply and therefore the energy supply of the actuating device is effected via an additional supply voltage line of the external control line. Such an actuator also comprises a voltage supply unit which is designed to provide, from a supply voltage that is applied to the supply voltage line, a supply DC voltage which is (solely) for the power supply of the motor control unit.

For reasons of flexibility, it would be desirable for an actuator to be able to be supplied with both AC voltage and DC voltage, and also combined with actuators of older structural format which are connected in parallel to the shared external control line.

When using the actuators described above, the direction of rotation is determined on the basis of the "signal states" of the two motor lines, i.e. the Y1 line and the Y2 line. In this case, the motor rotates in a first direction of rotation when a corresponding motor voltage is applied to the first motor line, and in a second, opposite direction of rotation when a corresponding motor voltage is applied to the second motor line. However, because one of the two motor lines is then without a load, all sorts of interference may be found there. The reasons for and types of the interference are many and various. It is therefore very challenging to identify an approach which covers the whole range of possibilities, functions in a resilient manner, comes to a decision quickly, and can be realized by reasonable means.

The great variety of the interferences is caused by the signal type of the motor voltage or signal voltage that is applied to the two motor lines. An AC voltage (AC) or a (pulsed) DC voltage (DC) can be applied respectively here, e.g. with a nominal voltage of 24V/AC or 24V/DC. Moreover, a not inconsiderable voltage may be coupled or induced into the motor line that is not electrically controlled. This coupling originates from the two motor lines being installed parallel to each other and is caused by their installation parallel to other lines carrying mains voltage, for example, and in particular by capacitive coupling of passive synchronous motors. As described above, the latter are operated directly and without further electronic circuit components on the two motor lines and the ground line as a reference potential. Since these induction motors comprise a starting capacitor so that they can start the motor in the respective direction of rotation, part of the motor voltage on the one motor line is coupled inductively via the "free" (i.e. not excited) motor coil and onward via the capacitor into the other motor line. In this case, the inductively coupled voltage can have a signal amplitude in the range from 80% to 240% of the nominal motor or mains voltage. The voltage thus induced can therefore have a signal amplitude which is considerably higher than the actual signal amplitude of the motor or mains voltage. There is also a significant phase angle between the one motor line receiving AC voltage and the other motor line, into which the voltage in inductively coupled via the "free" motor coil and the capacitor, in the range from 60° to 90°.

The total length of the external control line leading from a central control device can have a line length up to 300 m and that the motor or network frequency can be between 48 Hz and 62 Hz depending on the respective public network. As a result, the signals are corrupted to the extent that identification of the direction of rotation cannot be correctly attributed using simple means (depending on the signal amplitude). In many applications, the "Y inputs" of the actuators are operated via a central control device, which positions the actuators back and forth with short pulses. In order to ensure that the travel distance or the angle of rotation is not corrupted, it is extremely important to detect the true information content of the Y inputs as rapidly as possible, in order firstly to rotate in the correct direction as quickly as possible and secondly to capture the desired travel distance or the angle of rotation as precisely as possible.

The presence of AC voltage signals on the two motor lines could in principle be detected by capturing the peak values and zero crossings. However, this is problematic since the AC voltage signals are overlaid by a DC voltage component. These must first be removed, which disadvantageously requires additional processing time. Such a method is even then extremely susceptible to interference, particularly when switching the actuator on and off.

It is also conceivable to use "software" to store and gradually adapt the "cabling conditions", i.e. the extent of the influence of the cabling on the respective motor lines. The disadvantage of this is the duration of the adaptation, and that sporadic situation changes, e.g. the connection of a further actuator or a line change, could result in error states.

Finally, it is also conceivable to apply a heavier electrical load to the Y inputs, i.e. the inputs for the motor lines. This disadvantageously incurs higher electrical losses. Moreover, in the case of a parallel connection with an actuator having a synchronous motor, a load is placed on the phase that is shifted by 90° by a capacitor. The synchronous motor therefore loses the essential phase shift and no longer starts reliably. An installation engineer could admittedly resolve the problem using suitable measures, e.g. a "capacitor here or there". However, this again places higher demands on the specialists and also incurs high costs.

The teachings of the present disclosure may be used to enable an actuator which can be deployed in a more flexible manner. For example, in some embodiments, the motor is a brushless DC motor in particular. The actuator has a motor control unit comprising a signal evaluation unit and an actuating device which is arranged downstream therefrom for the motor. The actuating device can have e.g. three half-bridges for a three-phase DC motor or two half-bridges or an H-bridge for a two-phase DC motor. The half-bridges typically comprise two electrically controllable switching means, e.g. switching transistors, connected in series.

Some embodiments further comprise a voltage supply unit which is designed to provide, from the first and/or second motor voltage, a supply DC voltage for the power supply of the motor control unit. The voltage supply unit can have a diode or bridge rectifier for rectification. The supply DC voltage thus provided can subsequently be smoothed by means of a buffer capacitor and regulated to a constant voltage value by means of a subsequent voltage regulator.

In some embodiments, the signal evaluation unit produces, for the duration of the application of the first and/or second motor voltage to the first and second motor line, associated actuating signals for the actuating device. Lastly, the actuating device may electrically control the motor in the associated first or second direction of rotation on the basis of this.

In some embodiments, the actuator also comprises a voltage supply unit which is designed to provide, from the first and/or second motor voltage or from a supply voltage that is applied to the supply voltage line, a supply DC voltage for the power supply of the motor control unit.

In some embodiments, the signal evaluation unit produces, for the duration of the application of the first and/or second motor voltage to the first and second motor line, i.e. for the duration of the application of a first and/or second valid motor voltage, associated actuating signals for the actuating device. The actuating device is designed to electrically control the motor in the associated first or second direction of rotation on the basis of this.

These embodiments provide for the coupling out of the electrical power that is provided for the direct electrical supply of the passive synchronous motor from the two motor lines into a separate voltage supply unit for the power supply of the "electronic" motor control unit incorporating teachings of the present disclosure. Only the respective motor voltage on the two motor lines is evaluated with a view to determining the direction of rotation, in order to generate actuating signals $S_{OPEN}$, $S_{Y1}$, $S_{Y2}$, $S_{Y1+Y2}$ therefrom for a compact brushless DC motor which can advantageously now be used.

In some embodiments, the signal evaluation unit of the motor control unit comprises a digitization stage with a plurality of A/D converters for converting the two motor voltages into corresponding digital motor voltage signals. The conversion may be effected with a sampling frequency of at least 100 kHz, in particular with a sampling frequency of at least 1 MHz. The term "digital signals" generally signifies a temporally discrete sequence of digital values. The respective A/D converters can already be integrated in a microcontroller or signal processor as part of the signal evaluation unit.

In some embodiments, the signal evaluation unit, which may include a microcontroller with suitable program steps, also comprises a digital mixer stage for producing in each case a beat signal from the digitized motor voltage signals supplied on the input side and from a demodulation frequency. The respective beat signal here represents the effective value of the demodulated motor voltage signals. The effective value is also referred to as the RMS value (RMS: Root Mean Square).

The digital mixing and demodulation provokes a frequency shift in the spectrum of the motor voltage signals and results in a beat frequency. The latter may be derived arithmetically from the absolute value of the difference between the respective mains or motor voltage frequency (typically in a frequency range from 48 Hz to 62 Hz) which is applied to or switched onto the motor lines and the demodulation frequency of, in some embodiments, 55 Hz. The resulting beat frequency lies in the range from 0 Hz to 7 Hz according to the respective difference. A higher frequency mixing signal at 103 Hz to 107 Hz resulting from the digital mixing, from the sum of the mains or motor voltage frequency and the demodulation frequency of 55 Hz, is not processed further and may be filtered out by means of a digital low-pass filter. This means that a typical network frequency of 50 Hz or 60 Hz (the demodulation frequency of 55 Hz therefore lies precisely in the middle) results in a beat frequency of 7 Hz, which can be further processed particularly easily with a view to the subsequent digital signal processing. The two digital signals for the effective value of the demodulated motor voltage signals, said digital signals being output from the filter stage for the frequency shift, also have the beat frequency.

In some embodiments, after a few line periods, e.g. after two to three line periods, the effective value of the respective digital signal already has stable values and is moreover very resistant to signal interference. The same applies to the phase angle that forms between the digitized motor voltage signals. The signal processing further comprises a classification stage or signal classification stage which is designed or programmed to produce and output the actuating signals for the downstream actuating device of the actuator from the two beat signals or effective value signals.

In some embodiments, the signal state $S_{OPEN}$ signifies that no suitable voltage applied to two motor lines has been detected for the actuating mode. The motor therefore remains motionless. The signal state $S_{Y1}$ signifies that a suitable voltage for the actuating mode has been detected on the first motor line only, i.e. on the Y1 line. The motor is triggered in the first direction of rotation, e.g. to the right. The signal state $S_{Y2}$ has the corresponding significance for the Y2 line and hence for a second direction of rotation, e.g. to the left here.

The signal state $S_{Y1+Y2}$ signifies that a suitable voltage for the actuating mode has been detected on both motor lines. This state does not exist if the actuator is connected to a three-wire external control line, since a passive synchronous motor controlled in this way would remain motionless in the case of simultaneous electrical excitation. However, if the actuator is connected to a four-wire external control line, the state Y2 is prioritized and therefore the state $S_{Y2}$ is assumed.

In some embodiments, the digitization stage additionally comprises an A/D converter for converting the supply DC voltage into a corresponding digital supply DC voltage signal. The signal evaluation unit comprises a series of digital filters with moving average for filtering the supply DC voltage signal into a filtered supply DC voltage signal and for filtering the digitized motor voltage signals into filtered motor voltage signals. The high-frequency signal components are therefore filtered out in the manner of a lowpass. The digital mixer stage is also designed to produce a digital signal for a phase angle between the digitized motor voltage signals. Finally, the classification stage is designed to produce the actuating signals and output these to the downstream actuating device. This is effected as a function of whether a current value of the filtered motor voltage signals is less than a first DC voltage comparison value $DC_{LOW}$, exceeds a second DC voltage comparison value $DC_{UPP}$, or lies between both DC voltage comparison values $DC_{LOW}$, $DC_{UPP}$, whether a current value of the respective effective value signal exceeds a comparison value $AC_{UPP}$, and whether a current value of the phase angle signal is less than a first angle value $Phi_{LOW}$, exceeds a second angle value $Phi_{UPP}$, or lies between both angle values $Phi_{LOW}$, $Phi_{UPP}$. In this case, the first and second DC voltage comparison value $DC_{LOW}$, $DC_{UPP}$, the comparison value $AC_{UPP}$ and the first and second angle value $Phi_{LOW}$, $Phi_{UPP}$ are normalized to a current value of the filtered DC voltage supply signal.

Some embodiments provide possible adaptive operation of an actuator as described herein on an external control line with motor voltages of differing signal type (AC voltage, DC voltage), voltage amplitude and network frequency. By virtue of the normalization, the previously cited comparison values are automatically adapted for the subsequent classification. By comparing the filtered motor voltage signals with the second DC voltage comparison value $DC_{UPP}$, it is possible to detect e.g. DC voltage components that are present and therefore to determine a load-free state $S_{OPEN}$ if both filtered motor voltage signals exceed the second DC voltage comparison value $DC_{UPP}$ and if both effective value signals do not exceed the associated comparison value for the beat signal.

By comparing a current value of the phase angle signal with a lower and upper angle value $Phi_{LOW}$, $Phi_{UPP}$, it is possible to determine, e.g. in the event that the upper angle value $Phi_{UPP}$ is exceeded, that the respective effective value signal $Y1_{AC.R}$, $Y2_{AC.R}$, which exceeds the associated comparison value $AC_{UPP}$, corresponds to the state $S_{Y1}$ or $S_{Y2}$.

In some embodiments, the digital mixer stage comprises a quadrature demodulator and a transformation stage arranged downstream therefrom. The quadrature demodulator is also referred to as an IQ demodulator. It is so embodied as to have two channels in particular. The quadrature demodulator comprises a sine and cosine frequency generator for producing the demodulation frequency, and is designed to demodulate the two motor voltage signals, these being supplied on the input side, using the demodulation frequency in each case and to output these as digital signals with an associated real part and an associated imaginary part in each case. The downstream transformation stage, which is likewise so embodied as to have two channels, is designed to form the two effective value signals, i.e. the two beat signals, from these digital signals with the real and imaginary parts by means of polar coordinate transformation, and output said effective value signals to the classification unit.

In some embodiments, the classification stage comprises a normalization and comparator stage followed by a decision stage. The normalization and comparator stage is designed or programmed to produce, from a current value of the supply DC voltage signal or of a supply DC voltage signal that has been filtered by means of a digital filter with moving average, normalized decision thresholds for the motor voltage signals and for the effective value signals.

The normalization and comparator stage may provide output to a series of comparators including the binary comparison results $Y1_{DC.S}$, $Y1_{DC.G}$, $Y2_{DC.S}$, $Y2_{DC.G}$, $Y1_{AC.G}$, $Y2_{AC.G}$, $Phi_S$, $Phi_G$ with the motor voltage signals and the effective value signals to the decision stage. The decision stage is designed or programmed to produce and output the actuating signals for the downstream actuating device of the actuator according to a binary decision tree.

In some embodiments, the signal evaluation unit is designed to filter the digital signals with associated real part and associated imaginary part output by the quadrature demodulator in each case, by means of a digital filter with moving average, and then to output said digital signals to the transformation stage.

In some embodiments, the actuator can also be connected to an external control line with an additional supply voltage line for the further (alternative) energy supply to the actuator. The voltage supply unit is also designed to provide, from a supply voltage that is applied to the supply voltage line, the supply DC voltage for the power supply of the motor control unit. The signal evaluation unit comprises a digitization stage with a plurality of A/D converters for converting the two motor voltages into corresponding digital motor voltage signals. The signal evaluation unit comprises a digital mixer stage for producing in each case a low-frequency beat signal from the two motor voltage signals supplied on the input side. The respective beat signal again represents the effective value of the demodulated motor voltage signals in this case. The signal evaluation unit also comprises a classification stage, which is designed or programmed to generate the actuating signals $S_{OPEN}$, $S_{Y1}$, $S_{Y2}$, $S_{Y1+Y2}$ for the downstream actuating device of the actuator from the two beat signals.

In some embodiments, the digitization stage additionally comprises an A/D converter for converting the supply DC voltage into a corresponding digital supply DC voltage signal. The signal evaluation unit comprises a series of digital filters with moving average for filtering the supply DC voltage signal into a filtered supply DC voltage signal and for filtering the digitized motor voltage signals into filtered motor voltage signals. The high-frequency signal components are therefore filtered out in the manner of a lowpass. The signal evaluation unit also comprises a classification stage, which is designed to produce and output the actuating signals for the downstream actuating device of the actuator. This takes place as a function of whether a current value of the filtered motor voltage signals is less than a first DC voltage comparison value $DC_{LOW}$, exceeds a second DC voltage comparison value $DC_{UPP}$, or remains between both DC voltage comparison values $DC_{LOW}$, $DC_{UPP}$, and whether a current value of the respective effective value signal is less than a first comparison value $AC_{LOW}$, exceeds a second comparison value $AC_{UPP}$, or remains between both comparison values $AC_{LOW}$, $AC_{UPP}$. In this case, the first and second DC voltage comparison value $DC_{LOW}$, $DC_{UPP}$ and the first and second comparison value $AC_{LOW}$, $AC_{UPP}$ are normalized to a current value of the filtered DC voltage supply signal.

Some embodiments provide possible adaptive operation of an actuator as described herein on an external control line with motor voltages of differing signal type (AC voltage, DC voltage), voltage amplitude and network frequency. By virtue of the normalization, the previously cited comparison values are automatically adapted for the subsequent classification.

By comparing the filtered motor voltage signals with the second DC voltage comparison value $DC_{UPP}$, it is possible to detect e.g. DC voltage components that are present and therefore to determine a load-free state $S_{OPEN}$. If e.g. both filtered motor voltage signals respectively exceed the upper DC voltage comparison value $DC_{UPP}$, it depends on the current value of the respective effective value signal, whether this lies between the lower and upper comparison value $AC_{LOW}$, $AC_{LOW}$ or not (see FIG. 4).

In some embodiments, the digital mixer stage comprises a (two-channel) quadrature demodulator and a transformation stage arranged downstream therefrom. The quadrature demodulator comprises a sine and cosine frequency generator for producing the demodulation frequency, and is designed to demodulate the two motor voltage signals, these being supplied on the input side, using the demodulation frequency in each case and to output these as digital signals with an associated real part and an associated imaginary part in each case. The (two-channel) transformation stage is designed to form two digital signals for the effective value, from the digital signals with the real and imaginary parts by means of polar coordinate transformation, and to output said digital signals for the effective value to the classification unit.

In some embodiments, the classification stage comprises a normalization and comparator stage followed by a decision stage arranged downstream therefrom. The classification stage comprises a normalization and comparator stage followed by a decision stage. The normalization and comparator stage is designed to produce, from a current value of the filtered supply DC voltage signal, normalized decision thresholds for the filtered motor voltage signals and for the effective value signals, to output these to a series of comparators, and to output the binary comparison results $Y1_{DC.S}$, $Y1_{DC.G}$, $Y2_{DC.S}$, $Y2_{DC.G}$, $Y1_{AC.G}$, $Y2_{AC.G}$, $Phi_S$, $Phi_G$ with the filtered motor voltage signals and the effective value signals to the decision stage. Lastly, the decision stage is designed to produce and output the actuating signals $S_{OPEN}$, $S_{Y1}$, $S_{Y2}$, $S_{Y1+Y2}$ for the downstream actuating device of the actuator according to a binary decision tree.

In some embodiments, the signal evaluation unit is designed to filter the digital signals with associated real part and associated imaginary part output by the quadrature demodulator in each case, by means of a digital filter with moving average, and then to output said digital signals to the transformation stage. In some embodiments, the demodulation frequency according to a further embodiment variant is set to a frequency value of 55 Hz±3 Hz.

In some embodiments, the classification stage that is designed to produce the actuating signals is followed by a debounce filter stage, which is designed to filter out short-term signal changes in the actuating signals and then output the filtered actuating signals to the actuating device.

In some embodiments, the digitization stage is followed by a digital filter stage, comprising a digital filter in each case with moving average for filtering the digitized motor voltage signals and the digital supply DC voltage signal into filtered motor voltage signals and a filtered supply DC voltage signal. In some embodiments, the respective digital filter with moving average is a CIC filter.

The actuators described above can be used for adaptive operation of the actuator on an external control line to which motor voltages are applied with nominal voltage values of 24V/AC, 24V/DC, 120V/AC and 230V/AC, and which has a motor voltage frequency with frequency values in the range from 48 Hz to 62 Hz, this typically being derived from a network frequency.

FIG. 1 shows an example of two actuators 10 incorporating teachings of the present disclosure, each comprising a motor control unit 1 with a voltage supply unit 2, a signal evaluation unit SA and an actuating device SE, in combination with an actuator 10' which has a passive synchronous motor 3'. FIG. 1 shows an HVAC installation 100 comprising a central control device S and three actuators 10, 10'.

The central control device S and the actuators 10, 10' are connected to a shared external control line SL. The actuators 10, 10' each have a motor 3, 3' with a reduction gear 4 arranged downstream therefrom, followed by an actuating connection 5 for the purpose of connecting a flap 6 or a valve 7. For synchronous control of the three actuators 10, 10', the central control device S comprises two switch elements which can be triggered in the actuating mode in order to switch a mains voltage onto a first or a second motor line LY1, LY2 for the duration of the actuating mode. UN designates a mains voltage source, e.g. a 120V/60 Hz or 230V/50 Hz AC voltage source of a public energy supplier. It can also be e.g. an AC voltage source which is derived therefrom by means of transformer, e.g. a 24V/50 Hz or 24V/60 Hz AC voltage source. The nominal voltage of the AC voltage preferably lies in the range from 24 V to 48 V.

The illustrated external control line SL comprises the two motor lines or Y1/Y2 lines LY1, LY2 and a ground line GND as a reference potential. In this case, the control line is a three-wire control line SL which is used to supply energy and to determine the direction of rotation of the connected actuators 10, 10'.

A voltage supply line G is shown as a fourth (broken) line. In this case of a four-wire control line SL, the energy supply to the connected actuators 10 takes place via the voltage supply line G, and the determination of the direction of rotation in the form of actuating signals takes place via the two motor lines LY1, LY2. Operation of the actuator 10' comprising the passive synchronous motor 3' is therefore not possible. In the case of the four-wire control line SL, it is additionally possible to provide a DC voltage, e.g. a 24V/DC voltage at 0 Hz via the mains voltage source UN.

The lower part illustrates a known actuator 10', which only has a passive synchronous motor 3' that can be driven directly via the two motor lines LY1, LY2. A starting capacitor (not indicated further) is connected between the two motor lines LY1, LY2 in order to ensure that, when a mains voltage or motor voltage is switched onto one of the two motor lines LY1, LY2, the synchronous motor 3' is started by the resulting phase shift. Otherwise the synchronous motor 3' would remain motionless, even if a mains voltage or motor voltage was switched onto both motor lines LY1, LY2.

In some embodiments, the motor 3 of the two inventive actuators 10 is a DC motor and in particular a brushless DC motor (BLDC motor). The actuator 10 also has a motor control unit 1 comprising a signal evaluation unit SA and a downstream actuating device SE for the motor 3. It also has a voltage supply unit 2 which is designed to provide, from a first and/or second motor voltage UY1, UY2, applied to the respective motor line LY1, LY2, a supply DC voltage UP for the power supply of the motor control unit 1. For this purpose, the actuator 10 comprises an electrical connection AN with corresponding inputs ($E_{Y1}$, $E_{Y2}$, $E_{GND}$). The electrical connection AN already has a further additional input ($E_{PS}$) in order to provide the supply DC voltage UP from a supply voltage UPS that is applied to the supply voltage line G. The electrical connection AN can be embodied e.g. as a connection socket or as a connection cable AL which is then connected to the external control line SL.

In some embodiments, the signal evaluation unit SA of the actuator 10 produces, for the duration of the application of the first and/or second motor voltage UY1, UY2 to the first and second motor line LY1, LY2, associated actuating signals $S_{OPEN}$, $S_{Y1}$, $S_{Y2}$, $S_{Y1+Y2}$ for the actuating device SE. The latter is designed then to electrically control the motor 3 in the associated first or second direction of rotation on the basis of this. In the simplest case, the motor voltage UY1, UY2 applied respectively to the two motor lines LY1, LY2 is supplied to a voltage comparator. If neither of the two motor voltages UY1, UY2 exceeds the threshold value, the signal evaluation unit SA outputs the actuating signal $S_{OPEN}$ (for open lines). If both motor voltages UY1, UY2 exceed the threshold value, the signal evaluation unit SA outputs the actuating signal $S_{Y1+Y2}$ and, correspondingly, the actuating signal $S_{Y1}$ or $S_{Y2}$ if only one of the two motor lines LY1, LY2 carries a voltage.

Figure 2:
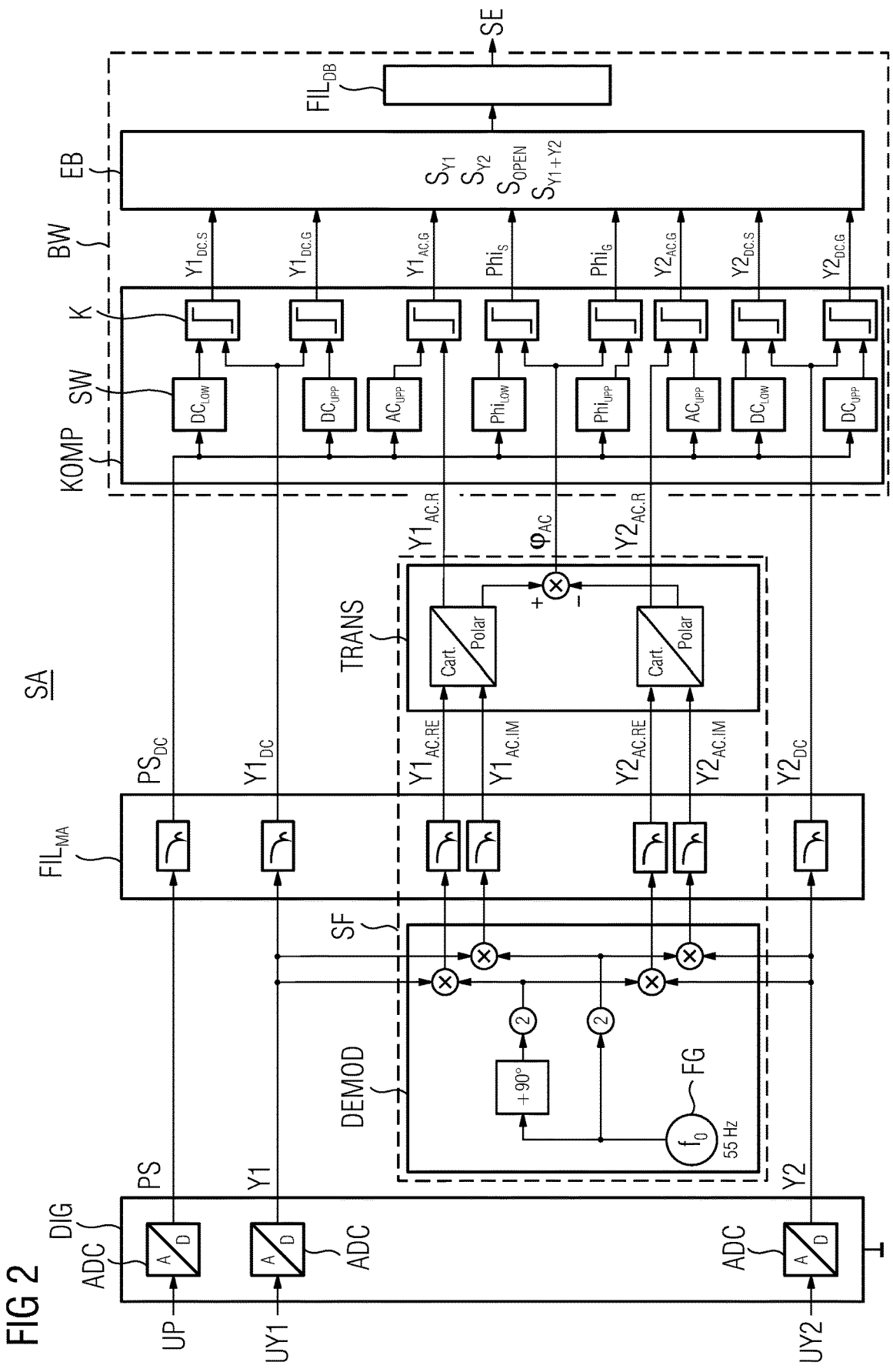
FIG. 2 shows a block circuit diagram of an exemplary signal evaluation unit of the actuator incorporating teachings of the present disclosure, for operation on a three-wire external control line via a central control device.

FIG. 2 shows a block circuit diagram of an exemplary signal evaluation unit SA of the actuator 10 incorporating teachings of the present disclosure, for operation on a three-wire external control line SL via a central control device S. The function blocks that are shown for the signal evaluation unit SA, such as a digitization stage DIG, a digital mixer stage SF and a classification stage BW for outputting the actuating signals $S_{OPEN}$, $S_{Y1}$, $S_{Y2}$, $S_{Y1+Y2}$, can be realized at least in part by a processor-assisted microcontroller, microprocessor or signal processor, for example, on which suitable software is available or loaded for the technical execution of function steps for signal processing in the function blocks DIG, SF, BW and the sub-function blocks DEMOD, TRANS, $FIL_{MA}$, KOMP, EB, $FIL_{DB}$.

A digitization stage DIG with a series of A/D converters ADC is illustrated in the left-hand part of FIG. 2. The two motor voltages UY1, UY2 and the supply DC voltage UP are read in at a high sampling rate and converted into digital signals PS, Y1, Y2. The sampling may take place at 100 kHz at least, e.g. at 1 MHz at least. The conversion therefore take place with a high clock cycle. Sufficient samples are therefore produced for effective averaging and any delay time in the processing thereof is minimized.

The two digitized motor voltage signals Y1, Y2 are supplied to a demodulator DEMOD, in particular a quadrature modulator, of the digital mixer stage SF. The quadrature demodulator DEMOD comprises a digital frequency generator FG, which produces a digital sine signal and a digital cosine signal in fixed 90° phase relation thereto with a demodulation frequency $f_0$ of 55 Hz. In this case, the 55 Hz may lie precisely in the middle of the two most common network frequencies of 50 Hz (e.g. Europe) and 60 Hz (e.g. North America). This means that any possible input oscillation lying between 48 Hz and 62 Hz is shifted by 55 Hz. A new oscillation (beat) is produced which lies between 0 Hz and 7 Hz. Any higher frequency components, particularly those between 103 Hz and 117 Hz, are removed by a subsequent digital filter with moving average.

The sine and cosine digital values comprising the output are each multiplied by a factor of two and are supplied in each case to both a digital mixer for mixing with the digitized motor voltage signal Y1 and a digital mixer for mixing with the digitized motor voltage signal Y2. Following the multiplication with the orthogonal demodulation signal and following the low-pass filtering with the moving average, a digital signal with the real part and the imaginary part $Y1_{AC.RE}$, $Y1_{AC.IM}$, $Y2_{AC.RE}$, $Y2_{AC.IM}$ is available in each case.

These digital signals are supplied to a transformation stage TRANS, this being a further part of the digital mixer stage SF, which transforms the digital signals with the real part and the imaginary part $Y1_{AC.RE}$, $Y1_{AC.IM}$, $Y2_{AC.RE}$, $Y2_{AC.IM}$ by means of two digital polar coordinate transformers into digital effective value signals or beat signals $Y1_{AC.R}/Y2_{AC.R}$ and into a digital phase angle signal $\varphi_{AC}$ that specifies the phase relationship of the two effective value signals $Y1_{AC.R}/Y2_{AC.R}$ and hence the phase relationship of the digitized motor voltage signals Y1, Y2 to each other.

In addition to the four digital filters with moving average, the filter stage $FIL_{MA}$ (MA: Moving Average) shown in FIG. 2 also comprises a digital filter with moving average for filtering each of the supply DC voltage signal PS and the two digitized motor voltage signals Y1, Y2 into a correspondingly filtered supply DC voltage signal $PS_{DC}$ and into two filtered digitized motor voltage signals $Y1_{DC}/Y2_{DC}$.

An individual average filter may lack filter resolution. This is increased by cascading a plurality of such filters. Since this can be very intensive computationally, some embodiments split the filter into two parts according to the CIC filter method (CIC: Cascaded Integrator Comb). The first part comprises (only) integrators and is easy and quick to "compute". The second part checks the differences relative to the results computed previously.

After filtering, the digital signals $PS_{DC}$, Dc, $Y2_{DC}$, $Y2_{AC.R}$, $\varphi_{AC}$ with the currently filtered value of the supply DC voltage $PS_{DC}$ are normalized by means of a normalization and comparator stage KOMP and supplied to a decision tree EB. The normalization and comparator stage KOMP and the in particular binary decision tree EB are parts of the classification stage BW in this case.

The normalization and comparator stage KOMP comprises a series of digital decision thresholds SW and a series of digital comparators K connected downstream therefrom. The digital decision thresholds SW each provide a digital value $DC_{LOW}$, $DC_{UPP}$, $AC_{UPP}$, $Phi_{LOW}$, $Phi_{UPP}$ on the output side, said digital values being proportional to a current value of the filtered supply voltage signal $PS_{DC}$. The indices LOW and UPP here signify "lower" and "upper" respectively. Therefore a normalization of the digital decision thresholds SW to the respectively applied supply DC voltage PS, $PS_{DC}$ takes place. Therefore an automatic adaptation of the inventive actuator 10 to a changing supply DC voltage PS, $PS_{DC}$, e.g. 24 V, 120 V or 230 V, is advantageously possible.

The normalized decision thresholds SW with the digital values $DC_{LOW}$, $DC_{UPP}$, $AC_{UPP}$, $Phi_{LOW}$, $Phi_{UPP}$ are supplied to a series of digital comparators K on the input side. One of the following digital signals $Y1_{AC.R}$, $Y2_{AC.R}$, $Y1_{DC}$, $Y2_{DC}$, $\varphi_{PC}$ is supplied to the other respective input of the comparators K. On the output side of the comparators K are the binary comparison results $Y1_{DC.S}$, $Y1_{DC.G}$, $Y2_{DC.S}$, $Y2_{DC.G}$, $Y1_{AC.G}$, $Y2_{AC.G}$, $Phi_S$, $Phi_G$. The indices S and G here signify "smaller" and "greater" respectively. Therefore e.g. the binary comparison result $Y1_{DC.S}$ signifies that a digital value of the filtered motor voltage signal $Y1_{DC}$ applied to the associated comparator K is less (lower) than the digital value $DC_{LOW}$ of the associated digital decision threshold SW.

The binary decision tree EB converts the series of output binary comparison results $Y1_{DC.S}$, $Y1_{DC.G}$, $Y2_{DC.S}$, $Y2_{DC.G}$, $Y1_{AC.G}$, $Y2_{AC.G}$, $Phi_S$, $Phi_G$ into the actuating signals $S_{OPEN}$, $S_{Y1}$, $S_{Y2}$, $S_{Y1+Y2}$ for the actuating device SE. The state $S_{OPEN}$, $S_{Y1}$, $S_{Y2}$, $S_{Y1+Y2}$ that has been detected may pass first through a debounce filter stage $FIL_{DB}$ (DB: debounce) with a series of digital debounce filters which exclude short-term signal outliers.

The most demanding conditions occur when the actuator 10 is switched on or off, and erroneous actuating states can occur during the transient event. In order to overcome the erroneous states, a digital debounce filter is connected downstream of the decision tree EB in each case, and only changes the state if this is consistently present for a while. The respective debounce filters have the character of a so-called bit filter. In this case, a state is positively or negatively integrated according to whether it is present or not. Therefore the integration value of each of the four states increases or decreases according to whether the corresponding state is identified. If a state is present for so long that the integration value reaches a predetermined threshold, it is taken as the active state from then on. The debounce time constant lies in the range from 10 ms to 50 ms, e.g. 25 ms.

Figure 3:
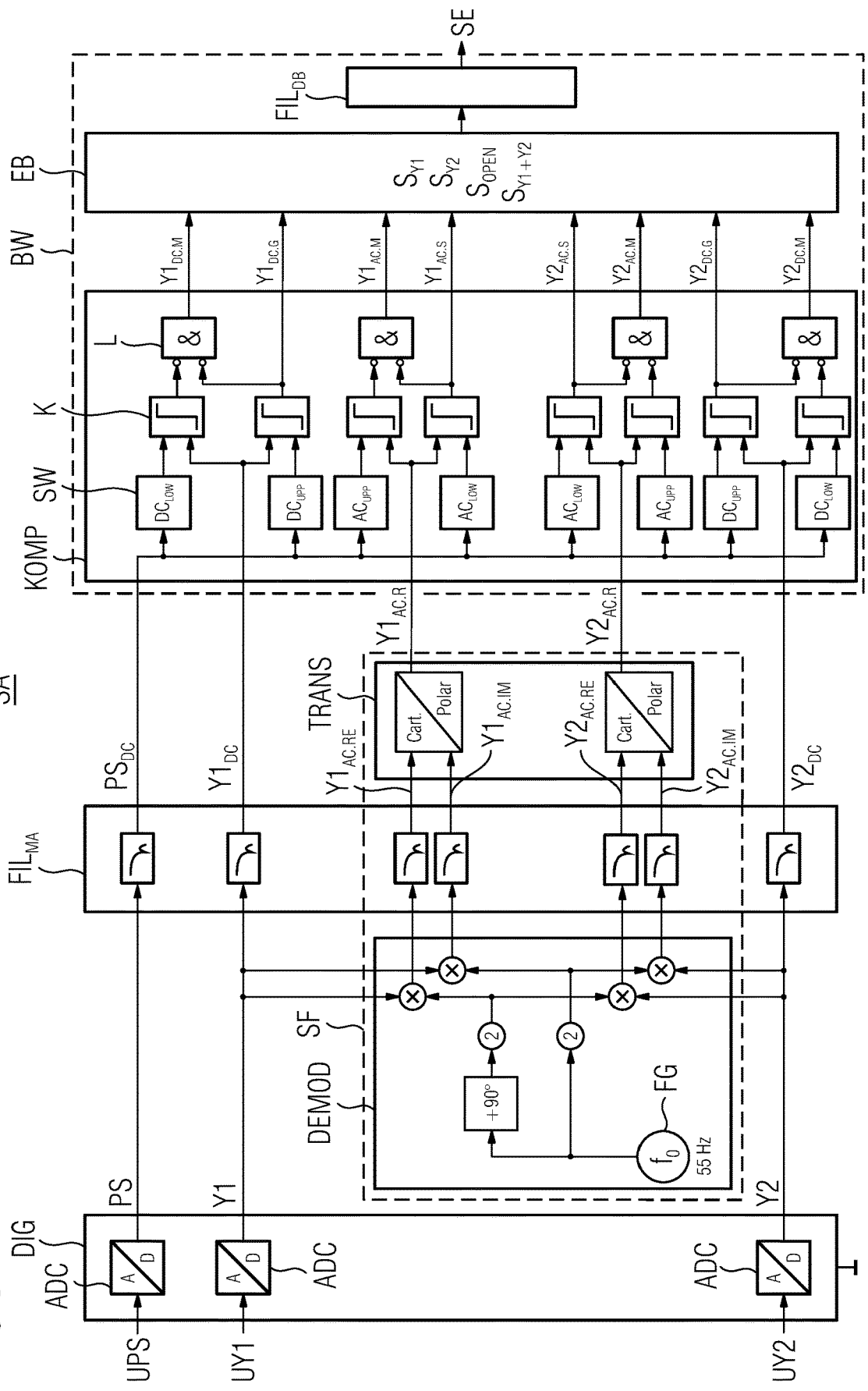
FIG. 3 shows a block circuit diagram of an exemplary signal evaluation unit of the actuator incorporating teachings of the present disclosure, for operation on a four-wire external control line via a central control device.

FIG. 3 shows a block circuit diagram of an exemplary signal evaluation unit SA of the actuator 10 incorporating the teachings here, for operation on a four-wire external control line SL via a central control device S. In comparison with the example in FIG. 2, there is no calculation of a phase angle signal (PAC here. This is not required in the four-wire case, since both "motor lines" LY1, LY2 are more or less load-free and serve merely to determine the direction of rotation. Moreover, actuators 10' with passive synchronous motors 3', which could cause inductive interference by coupling into the other motor line LY1, LY2, cannot be connected to such a four-wire control line SL.

The normalization and comparator stage KOMP here in turn comprises a series of digital decision thresholds SW and a series of digital comparators K connected downstream therefrom. The digital decision thresholds SW each provide a digital value $DC_{LOW}$, $DC_{UPP}$, $AC_{UPP}$, $Phi_{LOW}$, $Phi_{UPP}$ on the output side, said digital values being proportional to a current value of the filtered supply voltage signal $PS_{DC}$. The indices LOW and UPP here signify "lower" and "upper" respectively. Therefore a normalization of the digital decision thresholds SW to the respectively applied supply DC voltage PS, $PS_{DC}$ takes place. Therefore an automatic adaptation of the inventive actuator 10 to a changing supply DC voltage PS, $PS_{DC}$, e.g. 24 V, 120 V or 230 V, is advantageously possible.

The normalized decision thresholds SW with the digital values $DC_{LOW}$, $DC_{UPP}$, $AC_{UPP}$, $Phi_{LOW}$, $Phi_{UPP}$ are supplied to a series of digital comparators K on the input side. One of the following digital signals $Y1_{AC.R}$, $Y2_{AC.R}$, $Y1_{DC}$, $Y2_{DC}$, $\varphi_{AC}$ is supplied to the other respective input of the comparators K. On the output side of the comparators K are the binary comparison results $Y1_{DC.S}$, $Y1_{DC.G}$, $Y2_{DC.S}$, $Y2_{DC.G}$, $Y1_{AC.G}$, $Y2_{AC.G}$, $Phi_S$, $Phi_G$. The indices S and G here signify "smaller" and "greater" respectively. Therefore e.g. the binary comparison result $Y1_{DC.S}$ signifies that a digital value of the filtered motor voltage signal $Y1_{DC}$ applied to the associated comparator K is less (lower) than the digital value $DC_{LOW}$ of the associated digital decision threshold SW.

The binary decision tree EB, which converts the series of output binary comparison results $Y1_{DC.S}$, $Y1_{DC.G}$, $Y2_{DC.S}$, $Y2_{DC.G}$, $Y1_{AC.G}$, $Y2_{AC.G}$, $Phi_S$, $Phi_G$ into the actuating signals $S_{OPEN}$, $S_{Y1}$, $S_{Y2}$, $S_{Y1+Y2}$ for the actuating device SE, is illustrated in the following FIG. 4.

Figure 4:
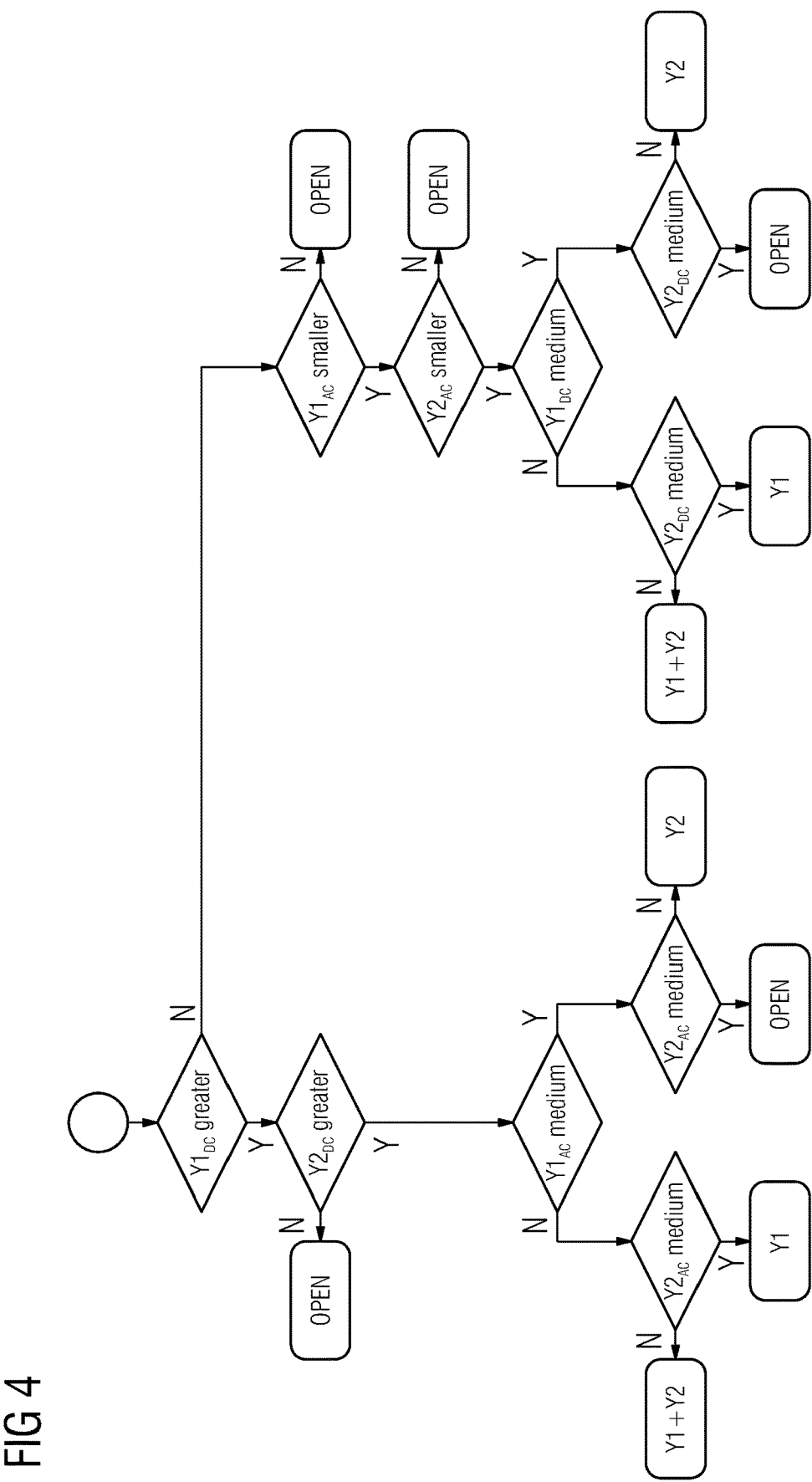
FIG. 4 shows a flow diagram of a binary decision tree of a decision stage, using the example of an operating mode of the actuator on a four-wire 24V/AC control line incorporating teachings of the present disclosure.

FIG. 4 shows a flow diagram of a binary decision tree of a decision stage EB, using the example of an operating mode of the actuator 10 on a four-wire 24V/AC control line SL incorporating teachings of the present disclosure. The binary decision tree shown is executed continuously, in particular cyclically, by the processor-assisted signal processing unit SA at a decision frequency which may be in the range from 100 Hz to 1000 Hz, and the respective result is then output as actuating signal $S_{OPEN}$, $S_{Y1}$, $S_{Y2}$, $S_{Y1+Y2}$.

It can be seen in the present example that e.g. if both filtered motor voltage signals $Y1_{DC}$, $Y2_{DC}$ each exceed the upper DC voltage comparison value $DC_{UPP}$, it depends on the current value of the effective value signal $Y1_{AC.R}$, $Y2_{AC.R}$. If the value of the first effective value signal $Y1_{AC.R}$ lies e.g. between the lower and upper comparison value $AC_{LOW}$, $AC_{LOW}$, and the value of the second effective value signal $Y2_{AC.R}$ does not, the state $S_{Y2}$ is assumed. Otherwise, the state $S_{OPEN}$ is assumed and output. However, if the value of the first effective value signal $Y1_{AC.R}$ does not lie between the lower and upper comparison value $AC_{LOW}$, $AC_{LOW}$, but the value of the second effective value signal $Y2_{AC.R}$ does, then the state $S_{Y1}$ is assumed. Otherwise, the state $S_{Y1+Y2}$ is assumed and output.

Following each execution of the binary decision tree, at the earliest after two but at the latest after four queries or comparisons, a definitive actuating signal $S_{OPEN}$, $S_{Y1}$, $S_{Y2}$, $S_{Y1+Y2}$ is available for output to the actuating device SE.

LIST OF REFERENCE SIGNS

1 Motor control unit
2 Voltage supply unit
3 Motor
3' Passive two-phase synchronous motor
4 Transmission, reduction gear
5 Actuating connection
6 Flap
7 Valve
10 Actuator
10' Passive actuator (prior art)
100 HVAC installation
ADC A/D converter
AL Connection line
AN Electrical connection
BW Classification stage
DEMOD Quadrature demodulator, IQ demodulator
DIG Digitization stage
EB Function block, decision tree
$FIL_{DB}$ Digital filter, debounce filter, debounce filter stage
$FIL_{MA}$ Digital filter, moving-average filter, filter with moving average
FG Frequency generator
$f_0$ Filter frequency
G Supply voltage line
GND Ground, reference voltage
K Comparator
KOMP Function block, normalization and comparator stage
L Logic gate
LY1 Motor line, Y1 control line
LY2 Motor line, Y2 control line
N 'No' decision
PS Digital value for supply DC voltage
$PS_{DC}$, $Y1_{DC}$, $Y2_{DC}$ Filtered digital values, digital signals
$Y1_{AC.RE}$, $Y1_{AC.IM}$,
$Y2_{AC.RE}$, $Y2_{AC.IM}$
S Control device, central control device
SA Signal evaluation unit
SF Digital mixer stage for beat frequency
SE Actuating device, inverter, half-bridge
SL Control line
SW Threshold value, digital values
$S_{OPEN}$, $S_{Y1}$ Actuating signals, state
$S_{Y2}$ $S_{Y1+Y2}$
TRANS Transformation stage, polar coordinate transformer
UN Mains voltage source
UP Rectified supply DC voltage
UPS Supply voltage
UY1 First motor voltage
UY2 Second motor voltage
Y 'Yes' decision
Y1, Y2 Digital motor voltage signals
$Y1_{ACR}$, $Y2_{ACR}$ Beat signal, effective value signal, RMS values, digital effective values
$\varphi_{AC}$ Phase angle

What is claimed is:

1. An actuator for a flap or a valve, the actuator comprising:
a brushless DC motor;
a transmission downstream of the motor;
an actuating connection between the transmission and the flap or the valve;
an electrical connection between the actuator and an external control line to supply energy to the actuator and to determine the direction of rotation of the motor;
a first motor line and second motor line and a ground line;
wherein the motor is driven in a first or second direction of rotation by a respective first or second motor voltage applied to the first or second motor line;
a motor control unit comprising a signal evaluation unit and a downstream actuating device for the motor;
a voltage supply unit to provide, from the first and/or second motor voltage, a supply DC voltage for a power supply of the motor control unit;
wherein the signal evaluation unit produces, for the duration of the application of the first and/or second motor voltage to the first and second motor line, associated actuating signals; and
the motor control unit electrically controls the motor in the associated first or second direction of rotation on the basis of actuating signals;
wherein the signal evaluation unit of the motor control unit further comprises:
a digitization stage including a plurality of A/D converters for converting the two motor voltages into corresponding digital motor voltage signals;
a digital mixer stage for producing in each case a beat signal from the digitized motor voltage signals supplied on the input side and from a demodulation frequency, wherein the respective beat signal represents the effective value of the demodulated motor voltage signals; and
a classification stage to produce, from the two beat signals, the actuating signals for the downstream actuating device of the actuator.

2. The actuator as claimed in claim 1, wherein:
the digitization stage includes an A/D converter for converting the supply DC voltage into a corresponding digital supply DC voltage signal;
the signal evaluation unit includes a series of digital filters with moving average for filtering the supply DC voltage signal into a filtered supply DC voltage signal and for filtering the digitized motor voltage signals into filtered motor voltage signals;
the digital mixer stage produces a digital signal for a phase angle between the digitized motor voltage signals; and
the classification stage produces the actuating signals and output them to the downstream actuating device, as a function of:
whether a current value of the filtered motor voltage signals is less than a first DC voltage comparison value $DC_{LOW}$, exceeds a second DC voltage comparison value $DC_{UPP}$, or lies between both DC voltage comparison values $DC_{LOW}$, $DC_{UPP}$;
whether a current value of the respective effective value signal exceeds a comparison value $AC_{UPP}$; and
whether a current value of the phase angle signal is less than a first angle value $Phi_{LOW}$, exceeds a second angle value $Phi_{UPP}$, or lies between both angle values $Phi_{LOW}$, $Phi_{UPP}$;
wherein the first and second DC voltage comparison value $DC_{LOW}$, $DC_{UPP}$, the comparison value $AC_{UPP}$ and the first and second angle value $Phi_{LOW}$, $Phi_{UPP}$ are normalized to a current value of the filtered DC voltage supply signal.

3. The actuator as claimed in claim 2, wherein the digital mixer stage comprises a quadrature demodulator and a transformation stage arranged downstream therefrom,
wherein the quadrature demodulator includes a sine and cosine frequency generator for producing the demodulation frequency and demodulates the two motor voltage signals supplied on the input side, using the demodulation frequency in each case, and to output these as digital signals with an associated real part and an associated imaginary part in each case; and
wherein the transformation stage forms the two effective value signals and the phase angle signal from the digital signals by means of polar coordinate transformation, and transmits said effective value signals to the classification unit.

4. The actuator as claimed in claim 3, wherein the signal evaluation unit filters the digital signals with associated real part and associated imaginary part output from the quadrature demodulator in each case, by means of a filter with moving average, and then to transmit said digital signals to the transformation stage.

5. The actuator as claimed in claim 2, wherein the classification stage comprises a normalization and comparator stage followed by a decision stage;
wherein the normalization and comparator stage produces, from a current value of the filtered supply DC voltage signal, normalized decision thresholds for the filtered motor voltage signals and for the effective value signals, to transmit these to a series of comparators and to transmit the binary comparison results with the filtered motor voltage signals and the effective value signals to the decision stage;
wherein the decision stage produces and transmits the actuating signals for the downstream actuating device of the actuator according to a binary decision tree.

6. The actuator as claimed in claim 1, wherein the demodulation frequency is set to a frequency value of 55 Hz±3 Hz.

7. The actuator as claimed in claim 1, wherein the classification stage producing the actuating signals is followed by a debounce filter stage to filter out short-term signal changes in the actuating signals and then output the filtered actuating signals to the actuating device.

8. The actuator as claimed in claim 7, wherein the respective digital filter with moving average comprises a CIC filter.

9. An actuator for a flap or a valve, the actuator comprising:
a brushless DC motor;
a transmission downstream of the motor;

an actuating connection between the transmission and the flap or the valve;

an electrical connection between the actuator and an external control line to supply energy to the actuator and to determine the direction of rotation of the motor;

a first motor line and second motor line and a ground line;

wherein the motor is driven in a first or second direction of rotation by a respective first or second motor voltage applied to the first or second motor line;

a motor control unit comprising a signal evaluation unit and a downstream actuating device for the motor;

a voltage supply unit to provide, from the first and/or second motor voltage, a supply DC voltage for a power supply of the motor control unit;

wherein the signal evaluation unit produces, for the duration of the application of the first and/or second motor voltage to the first and second motor line, associated actuating signals; and the motor control unit electrically controls the motor in the associated first or second direction of rotation on the basis of actuating signals, wherein:

the actuator can also be connected to an external control line with an additional supply voltage line for a further energy supply to the actuator;

the voltage supply unit provides, from a supply voltage that is applied to the supply voltage line, the supply DC voltage for the power supply of the motor control unit;

the signal evaluation unit comprises a digitization stage with a plurality of A/D converters for converting the two motor voltages into corresponding digital motor voltage signals;

the signal evaluation unit comprises a digital mixer stage for producing in each case a beat signal from the two digitized motor voltage signals supplied on the input side and from a demodulation frequency, wherein the respective beat signal represents the effective value of the demodulated motor voltage signals, and the signal evaluation unit comprises a classification stage to produce, from the two beat signals, the actuating signals for the downstream actuating device of the actuator.

10. The actuator as claimed in claim 9, wherein:

the digitization stage also has an A/D converter for converting the supply DC voltage into a corresponding digital supply DC voltage signal;

the signal evaluation unit includes a series of digital filters with moving average for filtering the supply DC voltage signal into a filtered supply DC voltage signal and for filtering the digitized motor voltage signals into filtered motor voltage signals; and the signal evaluation unit includes a classification stage which is designed to produce and output the actuating signals for the downstream actuating device (SE) of the actuator, as a function of:

whether a current value of the filtered motor voltage signals is less than a first DC voltage comparison value $DC_{LOW}$, exceeds a second DC voltage comparison value $DC_{UPP}$, or remains between both DC voltage comparison values $DC_{LOW}$, $DC_{UPP}$; and whether a current value of the respective effective value signal is less than a first comparison value $AC_{LOW}$, exceeds a second comparison value $AC_{UPP}$, or remains between both comparison values $AC_{LOW}$, $AC_{UPP}$;

wherein the first and second DC voltage comparison value $DC_{LOW}$, $DC_{UPP}$ and the first and second comparison value $AC_{LOW}$, $AC_{UPP}$ are normalized to a current value of the filtered DC voltage supply signal.

11. The actuator as claimed in claim 10, wherein:

the digital mixer stage comprises a quadrature demodulator and a transformation stage arranged downstream therefrom;

the quadrature demodulator includes a sine and cosine frequency generator for producing the demodulation frequency and demodulates the two motor voltage signals supplied on the input side, using the demodulation frequency in each case, and transmits these as digital signals with an associated real part and imaginary part in each case;

the transformation stage forms the two effective value signals from the digital signals by means of polar coordinate transformation and transmits these effective value signals to the classification unit.

12. The actuator as claimed in claim 11, wherein the signal evaluation unit filters the digital signals by the quadrature demodulator, using a filter with moving average, and then transmits said digital signals to the transformation stage.

13. The actuator as claimed in claim 10, wherein:

the classification stage comprises a normalization and comparator stage followed by a decision stage;

the normalization and comparator stage produces, from a current value of the filtered supply DC voltage signal, normalized decision thresholds for the filtered motor voltage signals and for the effective value signals, transmits these to a series of comparators and logic gates and transmits the respective binary comparison results $Y1_{DC.M}$, $Y1_{DC.G}$, $Y2_{DC.M}$, $Y2_{DC.G}$, $Y1_{AC.M}$, $Y1_{AC.G}$, $Y2_{AC.M}$, $Y2_{AC.G}$ with the filtered motor voltage signals and the effective value signals to the decision stage; and the decision stage produces and transmits the actuating signals for the downstream actuating device of the actuator according to a binary decision tree.

* * * * *